UNITED STATES PATENT OFFICE.

FRANK S. WASHBURN, OF RYE, NEW YORK, ASSIGNOR TO AMERICAN CYANAMID COMPANY, OF NEW YORK, N. Y., A CORPORATION OF MAINE.

PROCESS FOR PRODUCING FERROCYANIDS.

1,398,453.  Specification of Letters Patent.  Patented Nov. 29, 1921.

No Drawing.  Application filed February 7, 1920.  Serial No. 357,041.

*To all whom it may concern:*

Be it known that I, FRANK S. WASHBURN, a citizen of the United States, residing at Rye, in the county of Westchester and State of New York, have invented certain new and useful Improvements in Processes for Producing Ferrocyanids; and I do hereby declare the following to be a full, clear, and exact description of the invention, such as will enable others skilled in the art to which it appertains to make and use the same.

This invention relates to a process of producing ferrocyanids from a crude cyanid compound as produced from lime nitrogen and has for its object to improve the methods heretofore proposed.

With this and other objects in view the invention consists in the novel steps and combination of steps constituting the process, all as will be more fully hereinafter disclosed and particularly pointed out in the claims.

In order that the precise invention may be more clearly understood it is said:—It is well known in the art that when a solution of ferrous sulfate is treated with the sodium cyanid of commerce of say 96%-98% purity either in the form of a solution or in the solid state, sodium ferrocyanid is formed and may be removed from the solution by crystallization, or by evaporation and crystallization, or in some cases it may be used just as it is formed in the original solution, as for instance, in the production of Prussian blue and other insoluble compounds.

I have found, however, that in the use of a cyanid made from lime nitrogen this method does not produce a desirable product, and that the procedure must be more complicated than the one at present in use on the so-called 96-98 per cent. grade of cyanid. I have further found, however, after a great many tests and experiments, that a pure ferrocyanid product can be obtained, as will be hereinafter pointed out, from such an impure cyanid as that made from lime nitrogen.

This said impure cyanid may be made, for example, by fusing lime nitrogen, common salt and calcium carbid together in an electric furnace to produce a mixture of sodium and calcium cyanids. The proportions in the charge may vary depending on the desired concentration of the cyanogen in the resulting product. For example, a standard grade of this said impure cyanid contains 19–20 per cent. cyanogen, probably largely in the form of calcium cyanid. Also it contains free lime, calcium carbid, carbon and other impurities in quantities depending on the materials from which it is produced and on the particular process used.

In carrying out this new and improved process I may dissolve ferrous sulfate in water, using, for example, proportions of 1 to 5 or 1 to 6. To this solution I add the said impure cyanid derived from lime nitrogen and in a dry, solid form, until it is present in an excess. The addition of this cyanid automatically warms up the solution almost to the boiling point and I then boil the solution until substantially all the cyanid is converted to a ferrocyanid. I now have a solution of sodium and calcium ferrocyanid contaminated by various soluble and insoluble impurities.

I next filter the solution and obtain an impure filtrate containing sodium ferrocyanid, calcium ferrocyanid in greater or lesser quantity, sodium chlorid, and calcium chlorid, and other impurities. The presence and quantity of each constituent will depend on the purity of the raw materials originally used.

I next evaporate this filtrate or solution until substantially all the ferrocyanid has separated out in the form of a meal from the now concentrated solution of chlorids and other compounds present. I next separate out this meal and discard the remaining solutions, which at most are found to contain not over 3 per cent. of the original ferrocyanid present in the reaction mixture.

This said meal is found to contain various proportions of calcium and sodium ferrocyanids and chlorids and other impurities depending on the grade of the original impure cyanid used.

I next dissolve this meal in hot water, and if the solution contains appreciable quantities of calcium salts, I add soda ash to precipitate all the calcium as a carbonate, and then filter. I find that this addition of sodium carbonate not only precipitates the calcium from the solution, but it also clarifies this said solution, and thus greatly simplifies the subsequent procedure. I, therefore, obtain a clear and purified solution of ferrocyanids which I now concentrate, if necessary, and remove a crop of high grade crystals. The mother liquor is next returned to the original reaction tank and worked through the process again.

Instead of adding the impure cyanid above mentioned to the ferrous sulfate solution and immediately filtering out the insoluble impurities, I may of course, before this said filtration step, add the soda ash to the crude unfiltered solution of sodium and calcium ferrocyanids. By following this particular precedure, the final result is the same as that above disclosed, but the soda ash will react on some of the combined calcium present, which would otherwise be filtered out, and therefore such addition of the soda ash before filtration will require more of that compound to carry out the process than is the case when it is added after the first filtration.

The lower grades of this said impure cyanid derived from lime nitrogen are found to contain a suitable ratio of sodium to cyanogen to enable the carrying out of the above process without the addition of very large quantities of soda ash in the purifying step, and it follows that said ash can not only precipitate combined calcium, but it can also satisfy any equivalent deficiency of sodium that may exist. In fact, the higher grades of said impure cyanids do not contain sufficient sodium to combine with all of the cyanogen present to form sodium ferrocyanid and said soda ash is relied upon in such cases to supply this deficiency, to the end that a sodium ferro-cyanid is formed.

An important advantage of the above process resides in the fact that I am enabled to produce ferrocyanids of very high purities from a cheap, impure raw material derived from lime nitrogen.

It is obvious that those skilled in the art may vary the details of the process without departing from the spirit of the invention, and I, therefore, do not wish to be limited to the above disclosure, except as may be required by the claims.

What I claim is:—

1. The process of producing ferrocyanid from a cyanid compound containing a substantial percentage of impurities which consists in reacting on said impure cyanid with a ferrous salt; removing any insoluble matter present; concentrating the solution thus obtained; and separating the ferrocyanid formed from the other constituents, substantially as described.

2. The process of producing ferrocyanid which consists in reacting on a crude cyanid compound derived from lime nitrogen with a ferrous salt in solution; removing the insoluble constituents from the solution, and concentrating the others to separate the ferrocyanid formed; substantially as described.

3. The process of producing ferrocyanid which consists in mixing a crude cyanid compound derived from lime nitrogen and a soluble ferrous salt, allowing the mixture to react in solution; removing the insoluble material from said solution; concentrating the soluble constituents to separate from said solution ferrocyanid crystals; redissolving said crystals and adding a reagent to precipitate the impurities present; and concentrating the solution thus obtained to remove a substantially pure ferrocyanid, substantially as described.

4. The process of producing sodium ferrocyanid which consists in reacting on an impure cyanid compound obtained from lime nitrogen with a ferrous salt to form a ferrocyanid containing an appreciable percentage of combined calcium; treating said ferrocyanid compound with a sodium salt to form sodium ferrocyanid and purifying the sodium ferrocyanid thus produced, substantially as described.

5. The process of producing sodium ferrocyanid from an impure cyanid derived from lime nitrogen which consists in reacting on said impure cyanid with a ferrous salt in solution; removing the insoluble matter; concentrating the remaining liquor; removing the solid crude ferrocyanid thus produced from said liquor; redissolving said crude ferrocyanid in water; adding thereto a soluble salt of sodium capable of reacting with calcium; removing any insoluble matter present in the solution; concentrating said solution; and subsequently removing the sodium ferrocyanid thus formed, substantially as described.

6. The process of producing sodium ferrocyanid from an impure cyanid obtained from lime nitrogen which consists in reacting on said impure cyanid in a water solution with ferrous sulfate to form a ferrocyanid; removing the insoluble matter present; concentrating the remaining liquor; removing the solid crude ferrocyanid thus separated out from said liquor; redissolving said crude ferrocyanid in hot water; adding sodium carbonate to said solution; removing the insoluble matter present; and subsequently concentrating said last named solution and removing the refined sodium ferrocyanid present, substantially as described.

In testimony whereof I affix my signature.

FRANK S. WASHBURN.